United States Patent
Kulkarni et al.

(10) Patent No.: US 12,537,660 B2
(45) Date of Patent: Jan. 27, 2026

(54) NEAR-RT RIC INITIATED E2 RESET

(71) Applicant: Parallel Wireless, Inc., Nashua, NH (US)

(72) Inventors: Pranesh Kulkarni, Bangalore (IN); Gajanana Garuda, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/544,426

(22) Filed: Dec. 18, 2023

(65) Prior Publication Data
US 2024/0204974 A1    Jun. 20, 2024

Related U.S. Application Data

(60) Provisional application No. 63/387,879, filed on Dec. 16, 2022.

(51) Int. Cl.
*H04L 5/00* (2006.01)

(52) U.S. Cl.
CPC .......... *H04L 5/0098* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 2023/0354132 A1* | 11/2023 | Gebert | H04W 36/385 |
| 2024/0236766 A1* | 7/2024 | Shete | H04W 88/12 |
| 2024/0259879 A1* | 8/2024 | Ranganath | H04W 28/18 |

OTHER PUBLICATIONS

"O-RAN Working Group 3, Near-Real-time RAN Intelligent Controller, E2 Application Protocol (E2AP)", O-RAN.WG3.E2AP-v02.03, 2022.
"O-RAN Working Group 3Near-Real-time RAN Intelligent Controller Architecture & E2 General Aspects and Principles", O-RAN.WG3.E2GAP-v02.02, 2022.

\* cited by examiner

*Primary Examiner* — Jae Y Lee
*Assistant Examiner* — Nam P. Cao
(74) *Attorney, Agent, or Firm* — Michael Y. Saji; Ashish Patel

(57) ABSTRACT

There is a need for a non-RT RIC to cause E2 sessions to be reset at a node. Accordingly, a system is described comprising a non-Real Time (RT) Radio Area Network (RAN) Intelligent controller (RIC), wherein the non-RT RIC further comprises an operations administration maintenance (OAM) server; a near-Real Time (RT) Radio Area Network (RAN) Intelligent controller (RIC) in communication with the non-RT RIC; and an E2 node in communication with the near-RT RIC providing connectivity to one or more User Equipments (UEs). The OAM server may be configured to periodically perform assessment of the E2 node. The near-RT RIC may be configured with an application programming interface (API) to enable the non-RT RIC, based on an assessment by the OAM server, to perform an E2 reset of E2 sessions at the E2 node.

20 Claims, 5 Drawing Sheets

NEAR-RT RIC INITIATED E2 RESET

CROSS-REFERENCE TO RELATED APPLICATIONS

The present application claims the benefit of priority under 35 U.S.C. § 119(e) to U.S. Provisional App. No. 63/387,879, filed Dec. 16, 2023 and having the title "OAM-policy based trigger function on Near RT RIC to reset E2 interface between an E2 Node and Near RT RIC," which is also hereby incorporated by reference in its entirety for all purposes. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This document also hereby incorporates by reference U.S. Pat. App. Nos. 18/174580 and U.S. Ser. No. 18/183,155 each in its entirety. Features and characteristics of and pertaining to the systems and methods described in the present disclosure, including details of the multi-RAT nodes and the gateway described herein, are provided in the documents incorporated by reference.

In addition, the following specification documents are also incorporated by reference in their entirety: O-RAN A1 interface: Application Protocol 3.0—November 2020 (ORAN.WG2.A1AP-v03.00); O-RAN A1 interface: General Aspects and Principles 2.01—November 2020 (ORAN.WG2.A1GAP-v02.01); O-RAN Near-RT RAN Intelligent Controller Near-RT RIC Architecture 1.01—November 2020 (O-RAN.WG3.RICARCH-v01.01); O-RAN Near-Real-time RAN Intelligent Controller Architecture & E2 General Aspects and Principles 1.01—July 2020 (O-RAN.WG3.E2GAP-v01.01); O-RAN A1 interface: Transport Protocol 1.0—October 2019 (ORAN-WG2.A1.TP-v01.00); IETF RFC 6241 (NETCONF).

BACKGROUND

Open RAN is the movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT(Real-Time) and Non-RT(Real-Time) RIC(RAN Intelligence Controller). Open RAN also disaggregates RAN from into components like RRH (Remote Radio Head), DU (Distributed Unit), CU (Centralized Unit), Near-RT (Real-Time) and Non-RT (Real-Time) RIC (RAN Intelligence Controller). Open RAN has published specifications for the 4G and 5G radio access technologies (RATs).

CU function is split into CU-CP (Control Plane) and CU-UP (User Plane) function to provide Control and User Plane separation. Open RAN solution needs to support: Open Interfaces between different functions; Software based functions; Cloud Native functions; Intelligence support via support for xApps/rApps; 3rd Party RRHs; Disaggregated functions; White Box COTS hardware support; and Data Path separated from Control plane traffic. The E2 interface is defined between CU-CP, CU-UP, O-DU, O-eNB, and Near-RT RIC.

Open RAN is an emerging technology in mobile telecoms. Open RAN has potential to bring multiple vendors to provide solution flexibility, new capabilities, and various optimizations to the network. Near-RT-RIC is a platform which provides infrastructure to host various performance optimization and value added xApps to improve RAN performances and optimizations. Various xApps are getting deployed on Near RT RIC for optimization and performances of E2 nodes such as eNB, gNBs, CU or DU. The action taken by one xApp may contradict the action taken by another xApps. There can be various use cases which can impact E2Nodes as well as RIC. For example, one xApp may use too many resources, or, one message can be dropped, requiring retransmission of a message (SCTP message etc). Or, resources at the E2 node can be exhausted, for example due to high CPU or memory usage. Due to this, it is likely that some E2 nodes may go out of sync with Near-RT-RIC, resulting in high failure rates.

SUMMARY

Figure 1B:
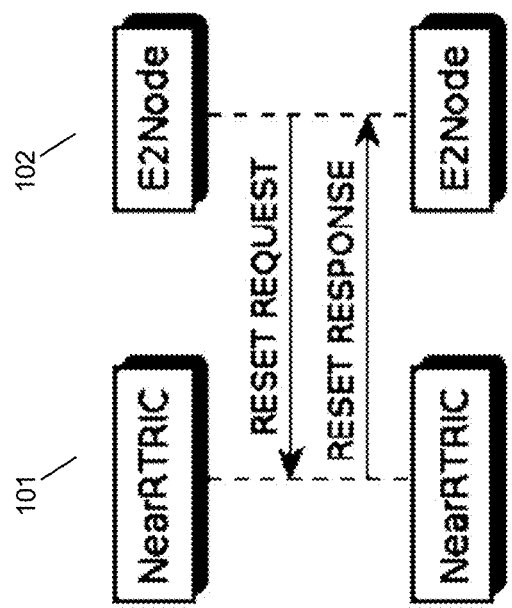
FIGS. 1A and 1B are schematic diagrams showing E2 reset request scenarios, in accordance with some embodiments.

There is a need for a non-RT RIC to cause E2 sessions to be reset at a node. Accordingly, a system is described comprising a non-Real Time (RT) Radio Area Network (RAN) Intelligent controller (RIC), wherein the non-RT RIC further comprises an operations administration maintenance (OAM) server; a near-Real Time (RT) Radio Area Network (RAN) Intelligent controller (RIC) in communication with the non-RT RIC; and an E2 node in communication with the near-RT RIC providing connectivity to one or more User Equipments (UEs). The OAM server may be configured to periodically perform assessment of the E2 node. The near-RT RIC may be configured with an application programming interface (API) to enable the non-RT RIC, based on an assessment by the OAM server, to perform an E2 reset of E2 sessions at the E2 node.

The E2 node may be either an eNodeB or a gNodeB. The E2 node may be a 2G or 3G node. The E2 node may be separated into a Distributed Unit (DU) and a Centralized Unit (CU). the OAM server also providing a user interface for an operator to review E2 node statistics and perform manual assessments. the OAM server also providing a user interface for an operator to manually request E2 resets from the near-RT RIC.

In a second embodiment, a method may be disclosed, comprising: receiving, at a non-Real Time (RT) Radio Area Network (RAN) Intelligent controller (RIC), the non-RT RIC The method may further comprise an operations administration maintenance (OAM) server, statistics for an E2 node; performing, periodically, assessment of the E2 node based on the received statistics; requesting, from the non-RT RIC to a near-Real Time (RT) Radio Area Network (RAN) Intelligent controller (RIC) in communication with the non-RT RIC, an E2 reset for the E2 node; and performing, at the near-RT RIC, steps to initiate the E2 reset for the E2 node.

The method may further comprise requesting the E2 reset using NETCONF or A1 or a REST API. The method may further comprise communicating with xAPPs at the near-RT RIC to initiate the E2 reset. The method may further comprise communicating with the E2 node to initiate the E2 reset.

DETAILED DESCRIPTION

Abbreviations used in this disclosure:

CU-CP: This node handles RRC and the control plane part of the PDCP protocol.

This node communicates with DU over F1-C interface and with CU-UP over E1 interface as defined in 3GPP specifications.

CU-UP/s: This node handles user plane part of PDCP protocol and SDAP protocol. It communicates with CU-CP over E1 interface and with DU over F1-U interface.

SMO (Service management and orchestration): control of infra structure component like CPU/Memory and scale up and scale down operations.

FCAPS (Fault, Configuration, Security, Performance, Accounting) management of Open-RAN elements (gNB-CU-CP, gNB-CU-UP, gNB-DU)

AMF/SMF: 3GPP defined 5G core network element for control signaling.

UPF: 3GPP defined 5G core network element for data-plane traffic.

DU (gNB-DU): 3GPP defined 5G access network element.

Currently ORAN WG3 standard on E2 interface defines a E2-RESET procedure, which is sent between RIC and E2Node so that they can start a fresh. The purpose of E2-RESET is to make both E2Node and RIC synch with each other. It is not clear on what basis, the decision to send E2-RESET must be taken on Near-RT-RIC to reset a E2 interface with an E2 Node.

A method is proposed here to come up with operator-policy based approach for triggering E2 RESET on Near RT RIC. In this method an operator can decide to generate an E2-RESET message based on different strategies.

Figure 1A:
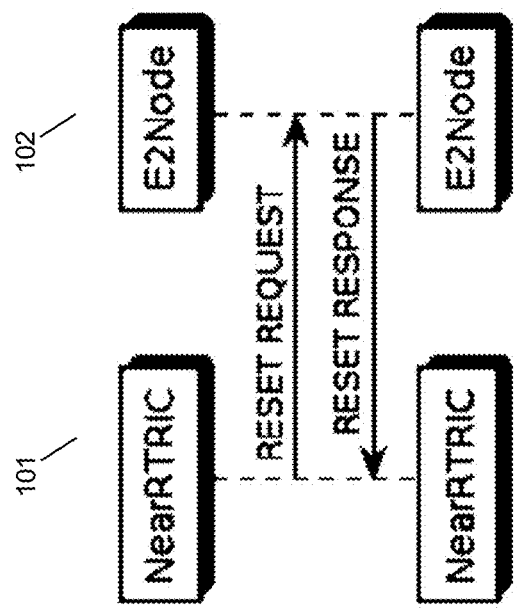

FIGS. 1A and 1B are schematic diagrams showing E2 reset request scenarios, in accordance with some embodiments. The purpose of the Reset procedure is defined in ORAN-WG3.E2AP spec. The purpose of the Reset procedure is to align the resources in E2 Node and Near-RT RIC in the event of an abnormal failure. The procedure resets the E2 interface. This procedure doesn't affect the application level configuration data exchanged during the E2 Setup procedure and RIC Service Update procedure. This procedure may be initiated by either Near-RT RIC (here shown as 101) or E2 Node (here shown as 102); the E2 node is typically a base station such as an eNB or gNB. FIG. 1A shows a near-RT RIC initiated E2 reset. FIG. 1B shows an E2 node initiated E2 reset.

However, although the standard defines the procedure for Near RT RIC initiating the E2 RESET procedure, it does not provide abnormal condition or make a use case for initiating such a request. Below we propose a use case, strategies for triggering the E2 RESET procedure from Near RT RIC or from a non-RT RIC (operations administration maintenance or OAM), and methods for doing so.

One such use case where operator-policy based intervention that triggers E2 interface reset from the Near RT RIC to an E2 Node. In this method Operator can decide to generate an E2-RESET message based on following strategies: 1. based on reported high error/failure statistics of E2Nodes at Near-RT-RIC: These statistics can be number of failure message to subscriptions, no response for few messages, abnormal responses etc.; 2. Operator/Admin wants to delete existing subscriptions and deploy renewed/modified subscriptions to E2 Node; 3. Based on the number of UEs at E2 node, e.g., to avoid interrupting service, the operator may not want to reset the E2 node prematurely without first offloading some or all UEs to different E2 nodes.

Based on the high failure rate on a E2 interface, Operator can initiate E2 RESET command using Netconf client towards Near RT RIC for chosen E2 Node. Based on the number of active UEs served at E2 Node. Operator may not want to reset the E2 node, until the UEs are offloaded to different E2 node. Near RT RIC which hosts Netconf service, shall trigger E2 RESET procedure over E2 interface towards chosen E2 Node. Following the trigger of E2 RESET towards E2 Node, Near RT RIC shall also inform all on-boarded xAPPs to begin cleaning up of subscriptions, if any, towards that E2 Node. Once the subscriptions are cleaned up, each xAPP shall re initiate fresh subscriptions towards E2 Node. Optionally there can be AI/ML based intelligent function which can periodically collect data from EMS, apply AI algorithm to take appropriate decision to trigger E2 RESET action. This involves no manual intervention. Such AI/ML function can be hosted inside or outside SMO. In case Operator wants to clear all the existing subscriptions and apply new/modified subscriptions in one go, can also trigger E2 RESET.

Figure 2:
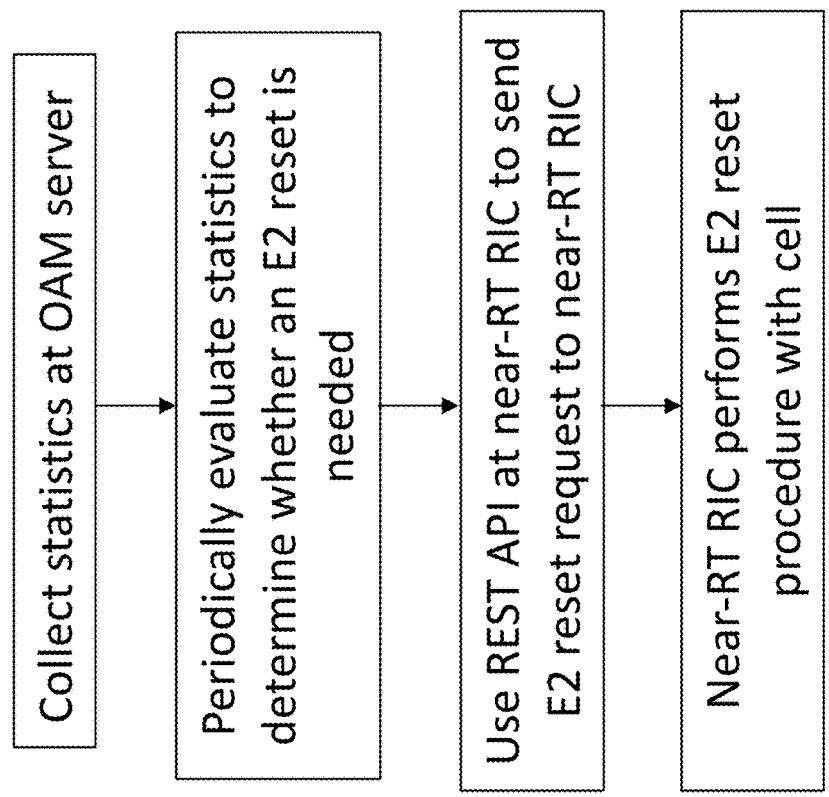
FIG. 2 is a flowchart showing OAM-initiated E2 reset, in accordance with some embodiments.

FIG. 2 is a flowchart showing OAM-initiated E2 reset, in accordance with some embodiments. An OAM server continually collects statistics, in most operator networks; these statistics are generally known in the art and are related to, e.g., upload and download speeds per UE, backhaul usage per E2 node, connection quality (RSSI), number of UEs at each E2 node, number of connections live, number of connections dropped within the last hour or other certain window of time, number of connections turned away because of overcapacity, and so on. These statistics are stored in a database at the OAM server and are periodically analyzed at a per-E2 node level. Periodically, the OAM server may assess whether an E2 node is performing poorly and, if performing poorly, whether an E2 reset could be performed to improve performance. The REST API at the near-RT RIC can be used to send the E2 reset request from the OAM server to the near-RT RIC. The near-RT RIC then performs the E2 reset procedure with the poorly performing cell to improve cell performance.

Figure 3:
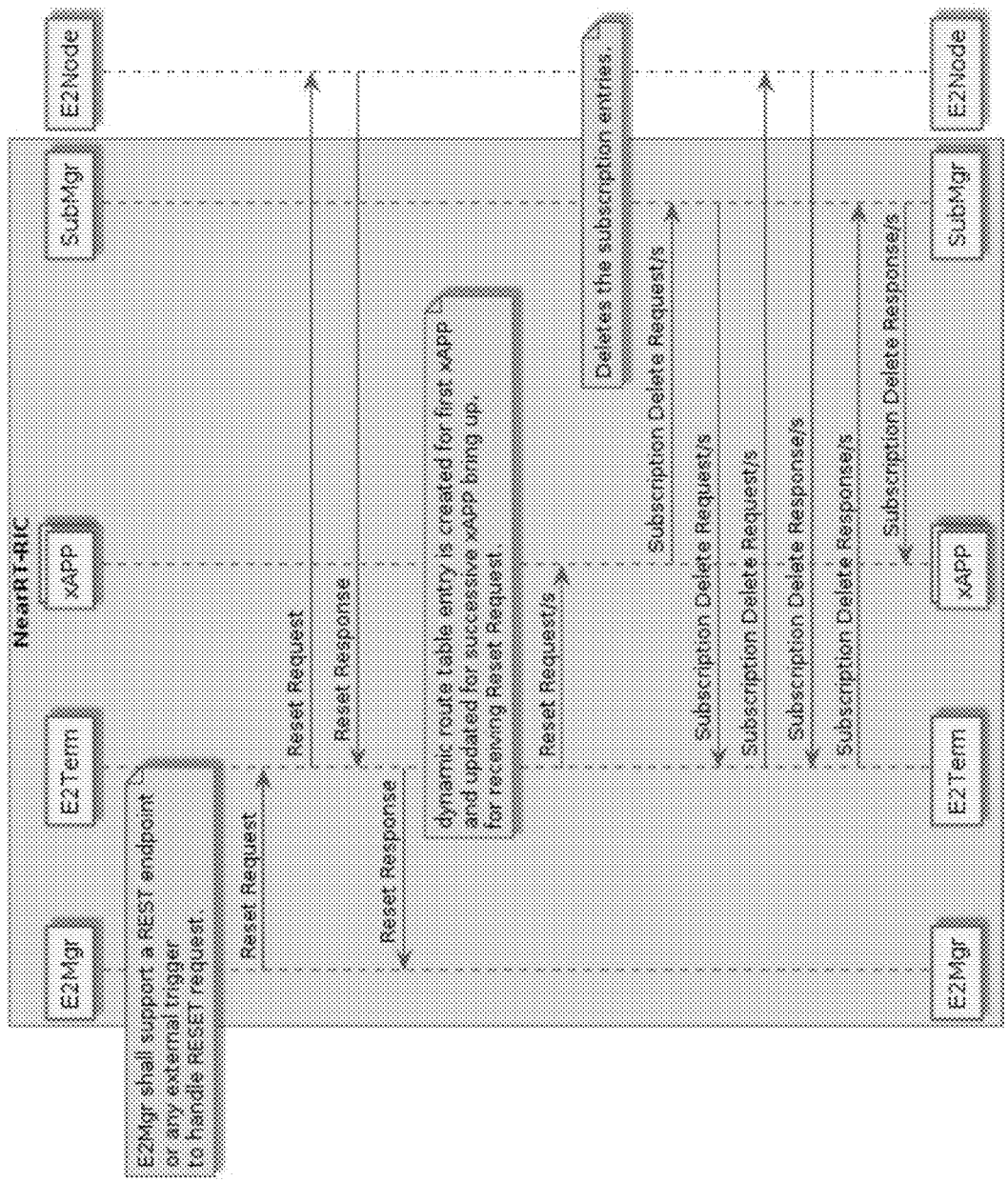
FIG. 3 is a call flow showing steps performed at a near-RT RIC for OAM-initiated E2 reset, in accordance with some embodiments.

FIG. 3 is a call flow showing steps performed at a near-RT RIC for OAM-initiated E2 reset, in accordance with some embodiments. An E2 manager (E2Mgr) service and an E2 Terminate (E2Term) service are shown, each running in virtual machines or pods or containers (henceforth containers) on the near-RT RIC. A plurality of xApps are also shown, each running in their own containers. e2term pod implements the capability to Accept/handle E2 RESET REQUEST from the remote E2 Node or OAM; it provides an externally accessible API. This e2term pod broadcasts the E2 RESET REQUEST to all the xAPPs that are on boarded on the RIC PLT.

When receiving a RESET request, the RESET request shall be received on corresponding E2 Term instance that connects to E2 Node. E2 Term shall forward the RESET request to all the xAPPs that are hosted on the NearRT-RIC. Upon receiving the RESET request each xAPP shall check whether it has subscriptions to that E2 Node from where RESET request is received. xAPP shall trigger SUBSCRIPTION DELETE procedure to delete subscriptions on that E2 Node. SubMgr shall delete the subscription entries stored for E2 Node and forward the same to E2 Term instance for sending it out to E2 Node. E2 Term shall always respond to RESET request with Successful RESET response. RMR routing (dynamic routing) shall be used for forwarding the RESET request to all xAPPs from the E2 Term. A RMR route table entry is created for the first xApp at the near-RT RIC in its internal routing table, and this table is updated for every successive xAPP bringup to enable receiving appropriate RESET requests. The same route entry is updated for the subsequent xAPPs when they are onboarded.

Sometimes the RESET can be generated by the RIC or by an external OAM or by a non-RT RIC. E2Mgr service on RIC PLT shall support a REST API/external trigger to handle RESET request. E2Mgr shall route E2 RESET event to corresponding E2 Term instance where E2 Node is connected to. This routing shall be RMR based. E2 Term shall frame a E2 RESET request to send it to E2 Node over the SCTP connection. E2 Term shall forward same RESET request to all the xAPPs that are hosted on the NearRT-RIC. RMR routing shall be used for forwarding the RESET request to all xAPPs from the E2 Term. Upon receiving the RESET request xAPP is required to check whether it has any subscriptions to that E2 Node from to which RESET is triggered. xAPP shall trigger SUBSCRIPTION DELETE procedure to delete subscriptions on that E2 Node. SubMgr shall delete the subscription entries stored for E2 Node and forward the same to E2 Term instance for sending it out to E2 Node. Subscription Delete Requests and E2 RESET request to E2 Node shall not be synchronous/ordered. They are independent procedures.

Turning to the xAPPs, when an xApp receives the reset request from RIC or from OAM, or when RIC PLT is triggering the RESET REQUEST, the xApps shall initiate SUBSCRIPTION DELETE. The xApp shall also support re-initiating the SUBSCRIPTION procedure when SUBSCRIPTION DELETE RESPONSE or RESET RESPONSE is received from the E2 node.

When E2 Reset procedure is initiated the Near-RT RIC and E2 Node shall: Delete any pre-established RIC Subscriptions, Gracefully terminate any ongoing Near-RT RIC call processes using INSERT, CONTROL or POLICY services while ensuring that impact to ongoing calls for connected UE is minimized; After the E2 Reset has been completed the Near-RT RIC shall re-issue any required Subscriptions.

Figure 4:
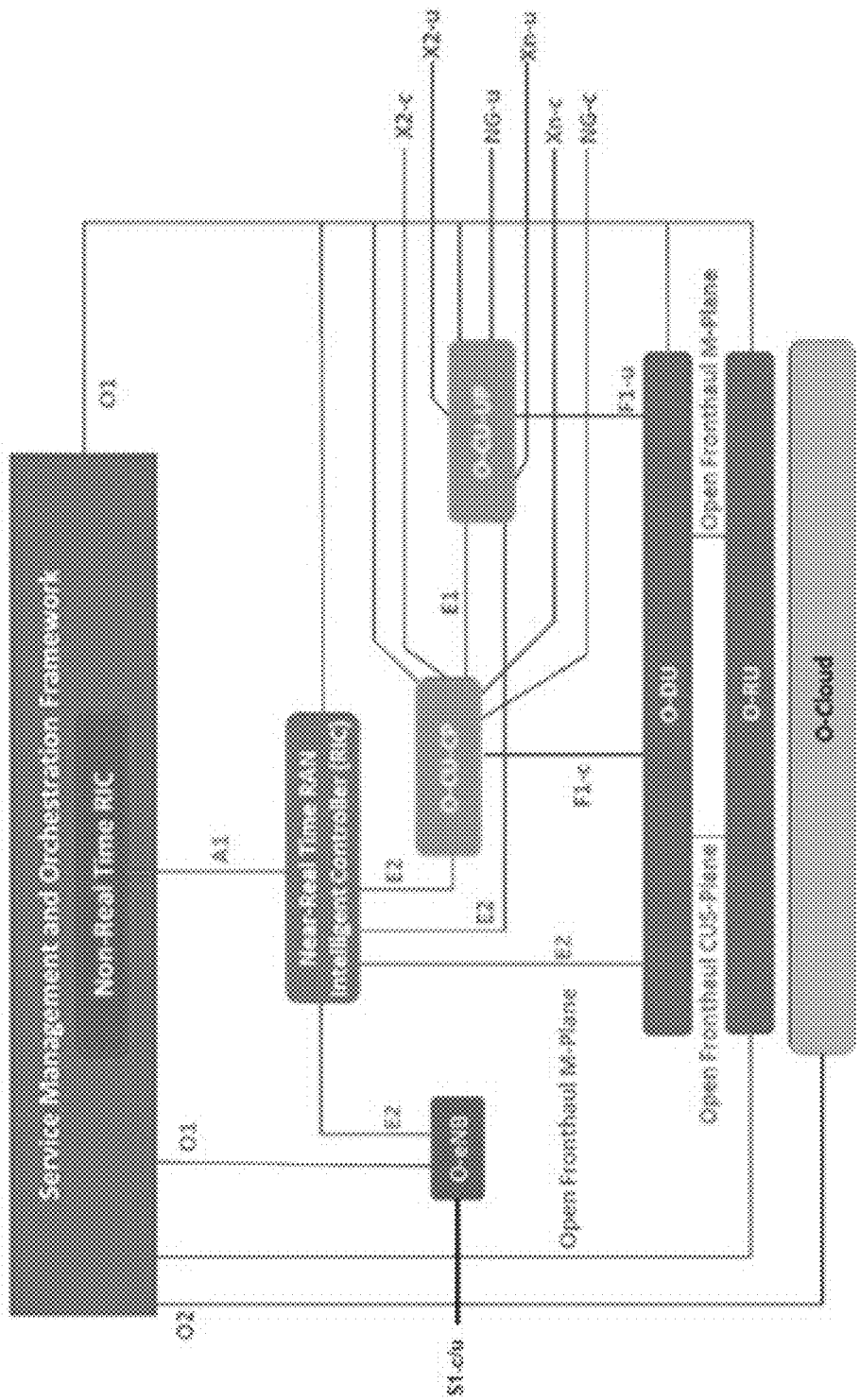
FIG. 4 is a schematic diagram of an OpenRAN core architecture, in accordance with some embodiments.

FIG. 4 is a schematic diagram of an OpenRAN core architecture, in accordance with some embodiments. The present disclosure is enabled for use with the disclosed architecture in this figure. The O-RAN deployment architecture includes an O-DU and O-RU, which together comprise a 5G base station in the diagram as shown. The O-CU-CP (central unit control plane) and O-CU-UP (central unit user plane) are ORAN-aware 5G core network nodes. An ORAN-aware LTE node, O-eNB, is also shown. As well, a near-real time RAN intelligent controller is shown, in communication with the CU-UP, CU-CP, and DU, performing near-real time coordination As well, a non-real time RAN intelligent controller (non-RT RIC) is shown, receiving inputs from throughout the network and specifically from the near-RT RIC and performing service management and orchestration (SMO) or operations administration maintenance (OAM) server, in coordination with the operator's network. Various nodes, for example the CU-CP and CU-UP nodes (here marked O-CU-CP and O-CU-UP to denote OpenRAN-compatible nodes), use SCTP and may use the methods and systems described herein for SCTP high availability. In some embodiments, a containerized architecture may be used and may provide the benefits of such an architecture to any of the higher layers and nodes, e.g., O-XXX, Near-RT RIC, etc. of this architecture as shown in the figure, in some embodiments.

As shown, the non-RT RIC, which is providing the OAM, receives data and collects it during operation of the network; and, at appropriate intervals, may perform a process that results in evaluating the performance of the network with respect to one or more eNodeB, gNodeB, or other E2-compliant base stations and requesting an E2 reset for certain E2-compliant base stations. The E2 reset is requested from the near-RT RIC shown near the center of the figure, and the near-RT RIC completes the process as described herein. Various different implementations of this architecture are contemplated which retain the logical separation shown in this figure between OAM, near-RT RIC, and base station.

In some embodiments, Service Management and Orchestration Framework (SMO) hosts EMS/OAM UI function, where Operator can periodically monitor statistics collected from Near RT RIC and also from E2 nodes via O1 interface.

It is understood that the present invention also applies to non-ORAN architectures.

Figure 5:
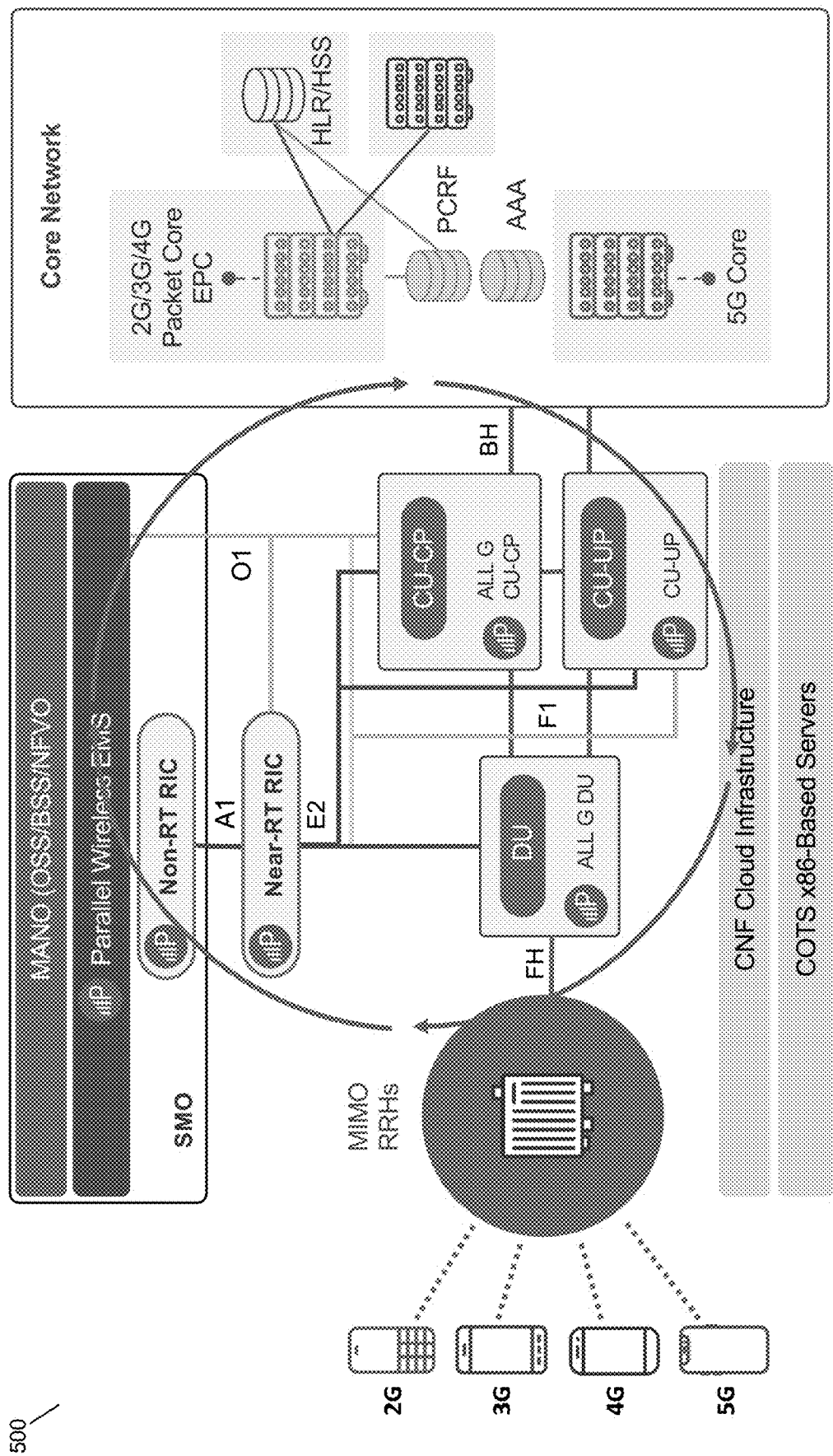
FIG. 5 is a schematic diagram of a multi-RAT RAN deployment architecture, in accordance with some embodiments.

FIG. 5 is a schematic diagram of a multi-RAT RAN deployment architecture, in accordance with some embodiments. The architecture shown is an ORAN-compliant architecture that also enables other radio access technologies (RATs), e.g., 2G and 3G, to interoperate and be coordinated by the non-RT RIC and near-RT RIC shown above in FIG. 4. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G, in some embodiments. Here, the node labeled "SMO/MANO(OSS/BSS/NFVO)" provides OAM functionality as described herein and can interface with the near-RT RIC to initiate an E2 reset as described herein. In some embodiments, an A1 interface or a NETCONF interface between the non-RT RIC and near-RT RIC may be used for this purpose.

Further Details

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, an internal controller keeps track of health of some or all pods & micro services in a given namespace. As soon as any pod/container crashes, it updates the remaining pods. And takes necessary steps to bring system in workable state.

In some embodiments, a database (Service registry) may act as service registry database for some or all pods and microservice in given namespace. All the pods on start-up can update required information in database & fetch required information from service registry database.

In some embodiments, the near-RT RIC may be an all-G or multi-RAT near-RT RIC. In other words, the near-RT RIC may perform processing and network adjustments that are appropriate given one or more applicable RATs. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments.

Although an A1 interface and a NETCONF interface are described between the near-RT RIC and the non-RT RIC, any other appropriate interface may be used to communicate between the near-RT RIC and the non-RT RIC. It is understood that in some embodiments a 2G, 3G, or other RAT node could also be capable of receiving and performing E2 resets; and such nodes could be managed using the systems and methods described herein.

Although the above systems and methods for policy provisioning are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to 5G networks, LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A system, comprising:
a non-Real Time (RT) Radio Area Network (RAN) Intelligent controller (RIC), the non-RT RIC further comprising an operations administration maintenance (OAM) server;
a near-Real Time (RT) Radio Area Network (RAN) Intelligent controller (RIC) in communication with the non-RT RIC; and
an E2 node in communication with the near-RT RIC providing connectivity to one or more User Equipments (UEs);
wherein the OAM server is configured to periodically perform assessment of the E2 node; and
wherein the near-RT RIC is configured with an application programming interface (API) to enable the non-RT RIC, based on an assessment by the OAM server, to cause a reset of an E2 interface between the near-RT RIC and the E2 node.

2. The system of claim 1, wherein the E2 node is either an eNodeB or a gNodeB.

3. The system of claim 1, wherein the E2 node is a 2G or 3G node.

4. The system of claim 1, wherein the E2 node is separated into a Distributed Unit (DU) and a Centralized Unit (CU).

5. The system of claim 1, wherein the OAM server is further configured to provide a user interface for an operator to review E2 node statistics and perform manual assessments.

6. The system of claim 1, wherein the OAM server is further configured to provide a user interface for an operator to manually request E2 resets from the near-RT RIC.

7. A method, comprising:
collecting, at a non-Real Time (RT) Radio Area Network (RAN) Intelligent controller (RIC), the non-RT RIC further comprising an operations administration maintenance (OAM) server, statistics for an E2 node;
performing, periodically, assessment of the E2 node based on the collected statistics;
requesting, from the non-RT RIC to a near-Real Time (RT) Radio Area Network (RAN) Intelligent controller (RIC) in communication with the non-RT RIC, a reset of an E2 interface between the near-RT RIC and the E2 node based on the assessment; and
at the near-RT RIC, initiating steps to reset the E2 interface to the E2 node.

8. The method of claim 7, wherein initiating steps to reset the E2 interface includes requesting an E2 reset using NETCONF or A1 or a REST API.

9. The method of claim 7, wherein initiating steps to reset the E2 interface includes communicating with xAPPs at the near-RT RIC to reset the E2 interface.

10. The method of claim 7, wherein initiating steps to reset the E2 interface includes communicating with the E2 node to reset the E2 interface.

11. The method of claim 7, wherein initiating steps to reset the E2 interface includes initiating offloading of a user equipment coupled to the E2 node to another E2 node before the E2 interface is reset.

12. The method of claim 7, wherein initiating steps to reset the E2 interface includes deleting, by an xAPP at the near-RT RIC, subscriptions on the E2 node before the E2 interface is reset.

13. The method of claim 12, further comprising re-issuing the subscriptions by the near-RT RIC after the E2 interface is reset.

14. The method of claim 12, further comprising applying new or modified subscriptions after the E2 interface is reset.

15. The method of claim 7, wherein requesting the reset of the E2 interface between the near-RT RIC and the E2 node includes requesting the reset of the E2 interface between the near-RT RIC and the E2 node without manual intervention.

16. The system of claim 1, wherein the near-RT RIC is further configured to initiate offloading of a user equipment coupled to the E2 node to another E2 node before the E2 interface is reset.

17. The system of claim 1, wherein the near-RT RIC is further configured to delete, by an xAPP at the near-RT RIC, subscriptions on the E2 node before the E2 interface is reset.

18. The system of claim 17, wherein the near-RT RIC is further configured to re-issue the subscriptions by the near-RT RIC after the E2 interface is reset.

19. The system of claim 17, wherein the near-RT RIC is further configured to apply new or modified subscriptions after the E2 interface is reset.

20. The system of claim 1, wherein to cause a reset of an E2 interface between the near-RT RIC and the E2 node includes to cause, without manual intervention, the reset of the E2 interface between the near-RT RIC and the E2 node.

* * * * *